Patented Oct. 19, 1937

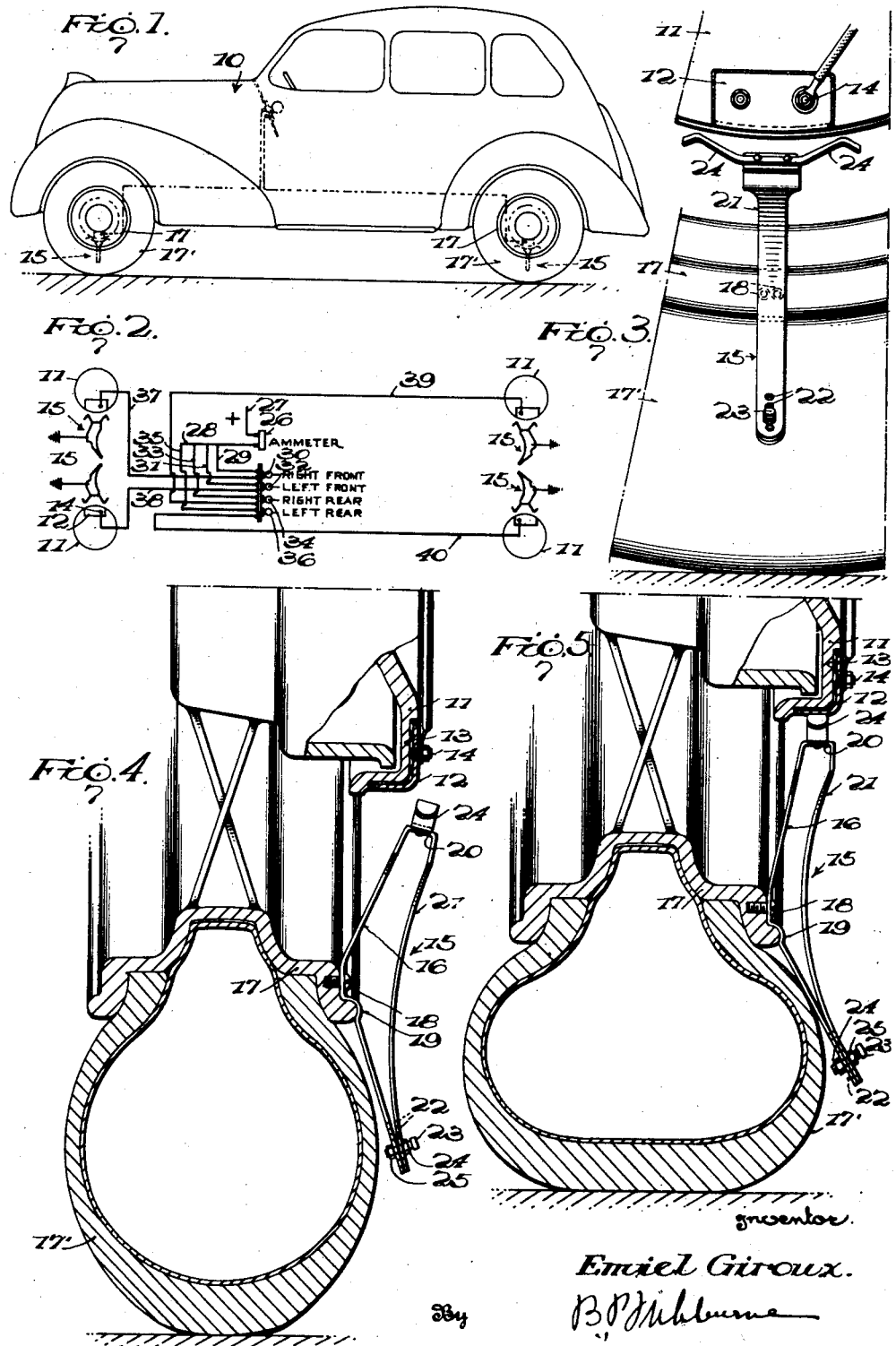

2,096,540

UNITED STATES PATENT OFFICE 2,096,540

TIRE DEFLATION SIGNAL

Emiel Giroux, Jamestown, N. Dak.

Application November 10, 1936, Serial No. 110,192

6 Claims. (Cl. 200—58)

My invention relates to a signal for indicating when an automobile tire is deflated below a desired or selected limit.

An important object of the invention is to provide a device of the above mentioned character, which is automatically actuated by the tire of the vehicle, when it is deflated below a selected limit, to produce a warning signal, apprising the driver or the like of the condition.

A further object of the invention is to provide a device of the above mentioned character, which is simple in construction, and adjustable so that it will function at selected limits of the deflation of the tire.

A further object of the invention is to provide a device of the above mentioned character, comprising an actuating element which is resilient and will yield freely and therefore not liable to be broken by the tire encountering an obstruction in the road.

Other objects and advantages of the invention will be apparent during the course of the following description.

In the accompanying drawing, forming a part of this application and in which like numerals are employed to designate like parts throughout the same, Figure 1 is the side elevation of an automobile having my indicating device applied thereto, Figure 2 is a diagrammatic view of the device and circuits, Figure 3 is a side elevation of the switch unit included in the device, Figure 4 is an edge elevation of the same, showing the movable contact carrying arm open; and, Figure 5 is a similar view with the movable arm closed.

In the drawing, wherein for the purpose of illustration is shown a preferred embodiment of my invention the numeral 10 designates an automobile as a whole, having wheels 11. As is well known, modern automobiles are equipped with four wheel brakes. Each wheel is, therefore, provided with brake mechanism including a stationary brake housing 11. The brake housings 11 are indicated in the diagrammatic view, Figure 2. A stationary contact segment 12 formed of copper or the like is rigidly mounted upon each housing 11 and is insulated therefrom, as shown at 13. The contact segment 12 is counter-sunk so that its face is flush with the outer face of the housing 11. Each contact segment has a binding post 14.

Each wheel is provided with a resilient movable or rocking contact carrying element or arm 15, which is preferably formed of a resilient steel strap, bent to form an inner bowed portion 16, the intermediate portion of which fits upon the metal rim 17 of the wheel and is rigidly secured thereto by a screw 18 or the like. The intermediate portion preferably has a bulging part 19, to receive the bead of the rim 17. The bowed portion 16 is arranged radially of the wheel, and at its inner end it is provided with a transverse portion or shoulder 20, the strap continuing in the form of the connecting portion 21. The outer ends of the bowed portion 16 and connecting portion 21 are provided with apertures 22, which are spaced longitudinally of these parts. These apertures are adapted to receive a bolt 23, carrying nuts 24 and 25. The portion 21 therefore connects the opposite ends of the bowed portion 16 and by passing the bolt 23 through the inner apertures 22 and then screwing up the nuts on the bolt, the ends of the bowed portion 16 will be brought closer together with the result that the sides of the bowed portion are brought closer together, and hence farther from the contact segment 12 and the tire 17'. The movable contact carrying element 15 carries a contact shoe 24, which is rigidly attached to the shoulder 20 and adapted to engage with the contact segment 12, and the housing 11, when shifted into the plane of rotation of this contact segment. The movable contact carrying element 15 is grounded to the frame of the automobile, which is also true of the housing 11.

The numeral 26 designates an ammeter, one side of which is connected with a positive wire 27, leading to the positive pole of a source of current, (not shown) and the negative side of this source of current is grounded to the frame of the automobile. Connected with the opposite side of the ammeter is a common feed wire 28. A branch wire 29 is connected with the wire 28 and is connected with one terminal of an electric bulb 30 designated "Right Front," for the right front wheel. A wire 31 is connected with the wire 28 and with one terminal of an electric bulb 32 designated "Left Front." A wire 33 is connected with the wire 28 and with one terminal of a bulb 34, designated "Right Rear." A wire 35 is connected with the wire 28 and with one terminal of a light 36, designated "Left Rear." A wire 37 is connected with the binding post 14 of the contact segment 12 of the right front wheel and is connected with the remaining terminal of the bulb 30. A wire 38 is connected with the terminal 14 of the contact segment 12 of the left front wheel and this wire is connected with the remaining terminal of the bulb 32. A wire 39 is connected with the binding post 14 of the segment 12 of the right rear wheel and this wire is connected with the remaining terminal of the bulb 34. A wire 40 is connected with the binding post 14 of the contact segment 12 of the left rear wheel and this wire is connected with the remaining terminal of the bulb 36.

The operation of the device is as follows: When the automobile is travelling, with the desired amount of air pressure in all the tires, all the contact shoes 24 are rotating out of contact with the contact segment 12. Assuming that the right front tire becomes deflated below a selected point, while the car is being driven, then the tire 17', will have its sides bulged outwardly, as shown in Figure 5. The side of the tire will then engage the outer end of the movable contact carrying element 15, and shift the outer end of the same laterally and outwardly and its inner end laterally and inwardly, whereby the resilient contact shoe 24 will travel in the plane of the stationary contact segment 12, and engage therewith and also with the housing 11 at the same time as the wheel is rotated. When the contact shoe 24 engages the contact segment 12 a circuit is closed to cause the "Right Front" bulb 30 to glow. In this closed circuit, current flows from the positive pole of the source of current through wire 27, ammeter 26, wire 29, bulb 30, wire 37, contact segment 12 of the left front wheel, contact shoe 24, through the ground and back to the opposite pole of the source of current. The ground may be made through the element 15 and rim 17, but if a wooden wheel is used, the ground is made by an end of the shoe 24 engaging the segment 12 and its opposite end engaging the housing 11, at the same time. In a similar manner, a circuit is closed when the tire on each of the remaining wheels becomes deflated below a selected point. It is thus seen that a separate signal is produced when any one of the tires becomes deflated below a selected point, and one or more of the signals may function at the same time. While I have shown each signal as being a visual signal the invention is not necessarily restricted to the use of the same as an audible signal device may be employed, if desired.

It is to be understood that the form of my invention herewith shown and described is to be taken as a preferred example of same and that various changes in the shape, size, and arrangement of parts, may be resorted to, without departing from the spirit of my invention or the scope of the subjoined claims.

Having thus described my invention, I claim:

1. A signal device to indicate when a pneumatic tire carried by a vehicle wheel is deflated below a selected limit, comprising a resilient arm clamped between its ends to the vehicle wheel, the arm having a contact part, means connecting the ends of the arms so that the movement of one end is transmitted to the other end, one end portion of the arm being shifted by the bulging of the tire due to deflation, and a contact segment secured to a stationary part of the vehicle for coaction with said contact part.

2. A signal device to indicate when a pneumatic tire carried by a vehicle wheel is deflated below a selected limit, comprising a bowed resilient arm rigidly attached between its ends to the vehicle wheel and having one end arranged near the tire to be moved thereby when the tire is deflated, an element connecting the ends of the resilient bowed arm so that one end moves the other, the opposite end of the resilient arm having a contact part, and a contact segment mounted upon a stationary part of the vehicle to be engaged by said contact part.

3. A signal device to indicate when a pneumatic tire carried by a vehicle wheel is deflated below a selected limit, comprising a resilient bowed arm having its intermediate portion attached to the wheel, the outer end of the arm being arranged near the tire and the inner end of the same having a contact part, a connecting element secured to one end of the arm, adjustable means attaching the opposite end of the connecting element to the opposite end of the arm, and circuit closing means actuated by one end portion of the arm.

4. A signal device to indicate when a pneumatic tire of a vehicle wheel having a rim and a brake housing is deflated, comprising a bowed resilient arm having its intermediate portion substantially rigidly mounted upon the rim and arranged generally radially so that its outer end is near the pneumatic tire and its inner end near the housing, means connecting the inner and outer ends of the bowed arm, a contact shoe carried by the inner end of the bowed arm, and a contact segment mounted upon the brake housing to be engaged by the contact shoe.

5. A signal device to indicate when a pneumatic tire carried by a vehicle wheel is deflated below a selected limit, comprising resilient arm, means to clamp the intermediate portion of the resilient arm to the wheel, the resilient arm being arranged generally radially with respect to the wheel and having its outer portion arranged near the pneumatic tire to be actuated thereby when the tire is deflated, the inner end of the outer portion being incapable of moving the inner end of the inner portion, means connecting the outer end of the outer portion with the outer end of the inner portion so that the outer portion may move the inner portion and means actuated by the movement of the outer end of the inner portion.

6. A signal device to indicate when a pneumatic tire carried by a vehicle wheel is deflated below a selected limit, comprising a resilient arm generally radially arranged, means to substantially clamp the intermediate portion of the resilient arm to the wheel so that the inner end of the outer portion of the arm is incapable of moving the inner end of the inner portion of the arm, the outer end of the outer portion having a longitudinal group of apertures, a resilient arm attached to the outer end of the inner portion and extending to the outer end of the outer portion and having a longitudinal group of apertures near its outer end, a connecting element for insertion through selected apertures in the two groups for connecting the elements of the apertures, and means actuated by the movement of the outer end of said inner portion.

EMIEL GIROUX.